United States Patent
Bouzekri et al.

(10) Patent No.: US 8,926,772 B2
(45) Date of Patent: Jan. 6, 2015

(54) METHOD OF PRODUCING AUSTENITIC IRON/CARBON/MANGANESE STEEL SHEETS HAVING A HIGH STRENGTH AND EXCELLENT TOUGHNESS AND BEING SUITABLE FOR COLD FORMING, AND SHEETS THUS PRODUCED

(75) Inventors: Mohamed Bouzekri, Rombas (FR); Michel Faral, Metz (FR); Colin Scott, Metz (FR)

(73) Assignee: Usinor, Puteaux (FR)

( * ) Notice: Subject to any disclaimer, the term of this patent is extended or adjusted under 35 U.S.C. 154(b) by 956 days.

(21) Appl. No.: 10/565,558

(22) PCT Filed: Jul. 8, 2004

(86) PCT No.: PCT/FR2004/001795
§ 371 (c)(1),
(2), (4) Date: Jun. 22, 2006

(87) PCT Pub. No.: WO2005/019483
PCT Pub. Date: Mar. 3, 2005

(65) Prior Publication Data
US 2006/0278309 A1   Dec. 14, 2006

(30) Foreign Application Priority Data

Jul. 22, 2003 (FR) .................................. 03 08953

(51) Int. Cl.
*C21D 8/02* (2006.01)
*C21D 7/02* (2006.01)
(Continued)

(52) U.S. Cl.
CPC ........... *H01M 4/8807* (2013.01); *C21D 8/0273* (2013.01); *H01M 4/8605* (2013.01);
(Continued)

(58) Field of Classification Search
USPC ......... 148/541, 547, 602, 622, 546, 538, 540, 148/557, 559, 579, 601, 603, 619, 620, 621, 148/648–664; 420/72–76, 129, 590
IPC .......... C21D 8/02,7/02, 7/13, 9/46; C22C 38/04
See application file for complete search history.

(56) References Cited

U.S. PATENT DOCUMENTS 4,648,440 A * 3/1987 Andersson et al. ........... 164/504
(Continued)

FOREIGN PATENT DOCUMENTS

EP   1 067 203   1/2001
(Continued)

OTHER PUBLICATIONS

Ferguson, B. Lynn, "Design for Deformation Processes," vol. 20: Materials Selection and Design, ASM Handbooks Online, 2002. (5 pages total).*

(Continued)

*Primary Examiner* — Scott Kastler
*Assistant Examiner* — Vanessa Luk
(74) *Attorney, Agent, or Firm* — Davidson, Davidson & Kappel, LLC

(57) ABSTRACT

The invention relates to a hot rolled sheet which is made from austenitic iron/carbon/manganese steel and which has a resistance of greater than 900 MPa, whereby: resistance (MPa) x elongation at rupture (%) is greater than 45000. The chemical composition of the inventive sheet comprises the following concentrations expressed as weight: 0.5%=C=0.7%, 17%=Mn=24%, Si=3%, Al=0.05%, S=0.03%, P=0.08%, N=0.1% and, optionally, one or more elements such as Cr=1%, Mo=0.4%, Ni=1%, Ti=0.5%, Nb=0.5%, V=0.5%, Cu=5%, Cu=5%, the rest of the composition comprising iron and impurities resulting from production. According to the invention, the recrystallised fraction of the steel is greater than 75% and the surface fraction of precipitated carbides of the steel is less than 1.5%, the average grain size of the steel being less than 18 micrometers.

12 Claims, 6 Drawing Sheets

(51) Int. Cl.
*C21D 7/13* (2006.01)
*C21D 9/46* (2006.01)
*C22C 38/04* (2006.01)
*H01M 4/88* (2006.01)
*H01M 4/86* (2006.01)
*H01M 4/90* (2006.01)
*H01M 4/92* (2006.01)
*H01M 8/02* (2006.01)
*H01M 8/10* (2006.01)

(52) U.S. Cl.
CPC .......... *H01M 4/8817* (2013.01); *H01M 4/8853* (2013.01); *H01M 4/8892* (2013.01); *H01M 4/9075* (2013.01); *H01M 4/925* (2013.01); *H01M 8/0232* (2013.01); *H01M 8/1004* (2013.01); *Y02E 60/50* (2013.01)
USPC ............................ 148/620; 148/603; 148/619

(56) References Cited

U.S. PATENT DOCUMENTS

| | | | |
|---|---|---|---|
| 6,358,338 B1 * | 3/2002 | Guelton et al. | 148/547 |
| 6,398,887 B1 | 6/2002 | Bouzekri | |
| 6,478,901 B1 | 11/2002 | Bouzekri | |
| 6,673,170 B1 | 1/2004 | Bouzekri | |
| 6,776,856 B2 | 8/2004 | Bouzekri | |
| 6,974,511 B1 | 12/2005 | Bouzekri | |
| 2003/0145911 A1 * | 8/2003 | Hoffmann et al. | 148/329 |
| 2004/0221928 A1 | 11/2004 | Bouzekri | |

FOREIGN PATENT DOCUMENTS

| | | |
|---|---|---|
| FR | 2 829 775 | 3/2003 |
| JP | 56-119722 | 9/1981 |
| JP | 04-259325 | 9/1992 |
| WO | WO 93/13233 * | 7/1993 |
| WO | WO 02/101109 A1 * | 12/2002 |

OTHER PUBLICATIONS

Glossary of Metallurgical and Metalworking Terms, ASM Handbooks Online, ASM International, 2002, Terms: skin pass and temper rolling.*
Professional translation of JP 04-259325 to Nomura et al., originally published in the Japanese language on Sep. 14, 1992.*
William D. Canister, Jr., Materials Science and Engineering, An Introduction, Sixth edition, John Wiley & Sons, 2003, pp. 174-175, 180-184.*
U.S. Appl. No. 11/814,329, filed Jul. 19, 2007, Scott, et al.
U.S. Appl. No. 11/339,545, filed Jan. 26, 2006, Bouzekri.
U.S. Appl. No. 09/610,224, filed Jul. 3, 2000, Bouzekri.
U.S. Appl. No. 12/373,152, filed Jan. 9, 2009, Scott, et al.

* cited by examiner

METHOD OF PRODUCING AUSTENITIC IRON/CARBON/MANGANESE STEEL SHEETS HAVING A HIGH STRENGTH AND EXCELLENT TOUGHNESS AND BEING SUITABLE FOR COLD FORMING, AND SHEETS THUS PRODUCED

FIELD OF THE INVENTION

The invention relates to the manufacture of hot-rolled and cold-rolled austenitic iron/carbon/manganese steel sheets exhibiting very high mechanical properties, and especially a particularly advantageous combination of mechanical strength and fracture elongation, excellent formability and a high fracture resistance in the presence of defects or stress concentrations.

PRIOR ART

It is known that certain applications, especially in the automotive field, require metal structures to be lightened and have greater strength in the event of an impact, and also good drawability. This requires the use of structural materials that combine high tensile strength with great deformability. In the case of hot-rolled sheet, that is to say with a thickness ranging from 0.6 to 10 mm, these properties are advantageously used to manufacture floor connection parts or wheels, reinforcing parts such as door anti-intrusion bars, or parts intended for heavy vehicles (trucks, buses). In the case of cold-rolled sheet (ranging from 0.2 mm to 4 mm), the applications are for the manufacture of beams that absorb deformation energy or engine cradles, or else skin parts. However, tensile strength and deformability are competing properties, so much so that it is generally not possible to obtain very high values for one of the properties without drastically reducing the other. However, progress has been made recently in trying to meet these requirements better, in particular thanks to the development of what are called TRIP (Transformation Induced Plasticity) steels. However, this type of steel does not make it possible to obtain an elongation of greater than 25% for a strength level of 900 MPa. Although these properties may be satisfactory for a number of applications, they nevertheless remain insufficient if further lightening is desired, and under severe stressing conditions such as those encountered in automobile collisions.

Also known are austenitic Fe—C(0 to 1.5%)—Mn(15 to 35%)—Cr(0 to 20%)—Al(0.1 to 10%)—Si(0 to 4%) steels that combine good strength with excellent ductility. The mode of deformation of these steels depends only on the stacking fault energy or SFE. Among these modes, mechanical twinning makes it possible to obtain high work-hardenability. Twins, by acting as an obstacle to the propagation of dislocations, thus help to increase the flow stress. The twinning deformation mechanism is favoured by increasing the stacking fault energy up to a limit (about 30 mJ/m$^2$), above which perfect dislocation glide becomes the dominant deformation mechanism. The SFE increases with the carbon, manganese and aluminum contents. Patent EP 0 573 641 discloses a hot-rolled or cold-rolled austenitic steel containing less than 1.5% C, 15-35% Mn and 0.1-6% aluminum, the strength of which is greater than 490 MPa and the elongation greater than 40% at room temperature.

However, rolling this type of composition requires particular precautions to be taken so as to prevent the formation of defects.

There is also an unsatisfied need for having steel sheet exhibiting even more favorable (strength/elongation at fracture) combinations, while limiting the content of expensive alloying elements.

Furthermore, experience shows that, despite favorable elongation values in uniaxial tension, cold forming (drawing, relatively complex bending, etc.) may pose difficulties in certain cases. In addition, since the parts produced from such sheet very often include regions corresponding to stress concentrations, there is a major need to have steel of high toughness, that is to say in which the fracture or tear resistance in the presence of defects is high, in particular under dynamic stressing. This property is all the more important to take into consideration when the applications of these grades, for example in automobiles, relate specifically to very highly stressed regions and/or to safety components.

SUMMARY OF THE INVENTION

It is therefore an object of the invention to have a hot-rolled or cold-rolled steel sheet or product that is inexpensive to manufacture, has a strength of greater than 900 MPa after hot rolling, greater than 950 MPa after cold rolling, a (strength/elongation at fracture) combination such that the product P=strength (expressed in MPa)×elongation at fracture (in %) is greater than 45000, can be easily hot-rolled, is particularly suitable for undergoing cold forming, and has very good toughness under static or dynamic stressing conditions.

For this purpose, the subject of the invention is a hot-rolled austenitic iron/carbon/manganese steel sheet, the strength of which is greater than 900 MPa, the product (strength (in MPa)×elongation at fracture (in %)) of which is greater than 45000 and the chemical composition of which comprises, the contents being expressed by weight: 0.5%≤C≤0.7%; 17%≤Mn≤24%; Si≤3%; Al≤0.050%; S≤0.030%; P≤0.080%; N≤0.1%, and, optionally, one or more elements such that: Cr≤1%; Mo≤0.40%; Ni≤1%; Cu≤5%; Ti–0.50%; Nb≤0.50%; V≤0.50%, the rest of the composition consisting of iron and inevitable impurities resulting from the smelting, the recrystallized fraction of the steel being greater than 75%, the surface fraction of precipitated carbides of the steel being less than 1.5% and the mean grain size of the steel being less than 18 microns.

The subject of the invention is also a hot-rolled austenitic iron/carbon/manganese steel sheet, the strength of which is greater than 900 MPa, the product (strength (in MPa)×elongation at fracture (in %)) of which is greater than 60000 and the chemical composition of which comprises, the contents being expressed by weight: 0.5%≤C≤0.7%; 17%≤Mn≤24%; Si≤3%; Al≤0.050%; S≤0.030%; P≤0.080%; N≤0.1%, and, optionally, one or more elements such that: Cr≤1%; Mo≤0.40%; Ni≤1%; Cu≤5%; Ti≤0.50%; Nb≤0.50%; V≤0.50%, the rest of the composition consisting of iron and inevitable impurities resulting from the smelting, the recrystallized fraction of the steel being equal to 100%, the surface fraction of precipitated carbides of the steel being equal to 0% and the mean grain size of the steel being less than 10 microns.

The subject of the invention is also a process for manufacturing a hot-rolled sheet made of iron/carbon/manganese steel, in which: a steel is smelted whose chemical composition comprises, the contents being expressed by weight: 0.5%≤C≤0.7%; 17%≤Mn≤24%; Si≤3%; Al≤0.050%; S≤0.030%; P≤0.080%; N≤0.1%, and, optionally, one or more elements such that: Cr≤1%; Mo≤0.40%; Ni≤1%; Cu≤5%; Ti≤0.50%; Nb≤0.50%; V≤0.50%, the rest of the composition consisting of iron and inevitable impurities resulting from the smelting; a semifinished product is cast from this steel; the semifinished product of said steel composition is heated to a temperature of between 1100 and 1300° C.; the semifinished product is rolled with an end-of-rolling temperature of 890° C. or higher; a delay is observed between said end of rolling and a subsequent rapid cooling operation, in such a way that the point defined by said delay and said end-of-rolling temperature lies within an area defined by the ABCD'E'F'A plot, and preferably the ABCDEFA plot, of FIG. 1; and the sheet is coiled at a temperature below 580° C.

Preferably, the semifinished product is cast in the form of thin strip, being cast between steel rolls.

According to another preferred feature, after the coiling, the hot-rolled sheet is subjected to a cold deformation operation with an equivalent deformation ratio of 30% or less.

The subject of the invention is also a cold-rolled austenitic iron/carbon/manganese steel sheet, the strength of which is greater than 950 MPa, the product strength (in MPa)×elongation at fracture (in %) of which is greater than 45000 and the chemical composition of which comprises, the contents being expressed by weight: $0.5\% \leq C \leq 0.7\%$; $17\% \leq Mn \leq 24\%$; $Si \leq 3\%$; $Al \leq 0.050\%$; $S \leq 0.030\%$; $P \leq 0.080\%$; $N \leq 0.1\%$, and, optionally, one or more elements such that: $Cr \leq 1\%$; $Mo \leq 0.40\%$; $Ni \leq 1\%$; $Cu \leq 5\%$; $Ti \leq 0.50\%$; $Nb \leq 0.50\%$; $V \leq 0.50\%$, the rest of the composition consisting of iron and inevitable impurities resulting from the smelting, the recrystallized fraction of the structure of the steel being greater than 75%, the surface fraction of precipitated carbides of the steel being less than 1.5% and the mean grain size of the steel being less than 6 microns.

The subject of the invention is also a process for manufacturing a cold-rolled austenitic iron/carbon/manganese steel sheet, characterized in that a hot-rolled sheet obtained by one of the processes described above is supplied; at least one cold-rolling step followed by an annealing operation is carried out, each step consisting in cold-rolling the sheet and annealing it at a temperature of between 600 and 900° C. for a time of between 10 and 500 seconds, followed by a cooling operation, the cooling rate being greater than 0.5° C./s, the austenitic grain size, before the final cold-rolling step followed by an annealing operation, being less than 18 microns.

Preferably, after the final annealing, a cold-deformation operation is carried out on the cold-rolled sheet with an equivalent deformation ratio of 30% or less.

The subject of the invention is also the use of a hot-rolled or cold-rolled sheet described above or the use of a sheet manufactured by means of a process described above for the manufacture of reinforcing elements that are statically or dynamically stressed.

BRIEF DESCRIPTION OF THE DRAWINGS

Further features and advantages of the invention will become apparent over the course of the description below, which is given by way of example and with reference to the following appended figures.

DESCRIPTION OF THE PREFERRED EMBODIMENTS

Figure 1:
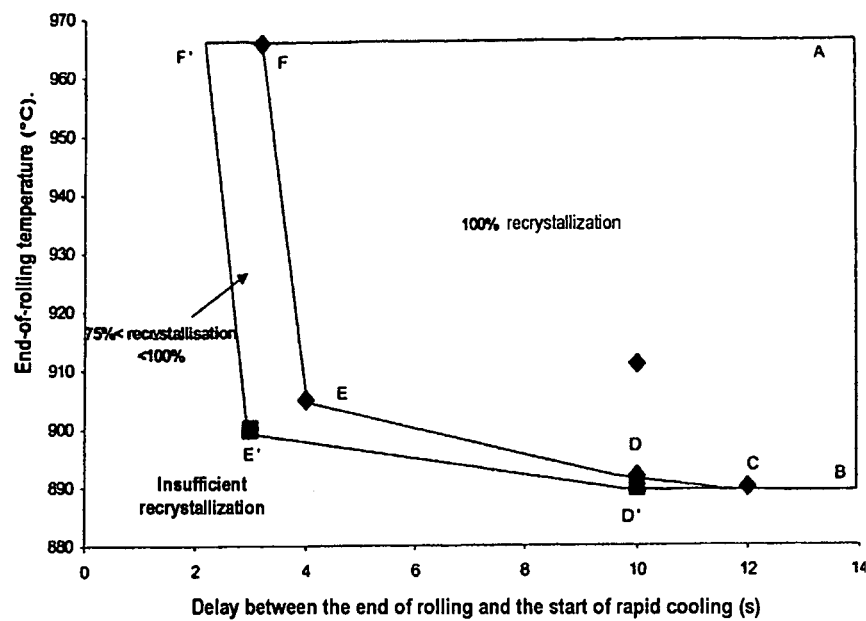
FIG. 1 shows the influence of the end of hot rolling temperature and of the delay between the end of hot rolling and the start of a subsequent rapid cooling operation on the recrystallized fraction after coiling.

After many trials, the inventors have shown that the various requirements reported above can be satisfied by observing the following conditions:

As regards the chemical composition of the steel, carbon plays a very important role in the formation of the microstructure: it increases the SFE and favors stability of the austenitic phase. When combined with a manganese content ranging from 17 to 24% by weight, this stability is achieved for a carbon content of 0.5% or higher. However, for a carbon content above 0.7%, it becomes difficult to prevent the precipitation of carbides that occurs during certain thermal cycles in industrial manufacture, in particular when the steel is being cooled at coiling, and that degrades both ductility and toughness.

Manganese is also an essential element for increasing the strength, increasing the stacking fault energy and stabilizing the austenitic phase. If its content is less than 17%, there is a risk of martensitic phases forming, which phases very appreciably reduce the deformability. Moreover, when the manganese content is greater than 24%, the ductility at room temperature is reduced. In addition, for cost reasons, it is undesirable for the manganese content to be high.

Aluminum is a particularly effective element for the deoxidation of steel. Like carbon, it increases the stacking fault energy. However, aluminum is a drawback if it is present in excess in steels having a high manganese content. This is because manganese increases the solubility of nitrogen in liquid iron, and if an excessively large amount of aluminum is present in the steel the nitrogen, which combines with aluminum, precipitates in the form of aluminum nitrides that impede the migration of grain boundaries during hot transformation and very appreciably increases the risk of cracks appearing. An Al content of 0.050% or less prevents the precipitation of AlN. Correspondingly, the nitrogen content must not exceed 0.1% so as to prevent this precipitation and the formation of volume defects (blowholes) during solidification.

Silicon is also an effective element for deoxidizing steel and for solid-phase hardening. However, above a content of 3%, it tends to form undesirable oxides during certain assembly processes and must therefore be kept below this limit.

Sulfur and phosphorus are impurities that embrittle the grain boundaries. Their respective contents must not exceed 0.030 and 0.080% so as to maintain sufficient hot ductility.

Chromium and nickel may be used as optional elements for increasing the strength of the steel by solution hardening. However, since chromium reduces the stacking fault energy, its content must not exceed 1%. Nickel contributes to the achievement of a high elongation at fracture, and in particular increases the toughness. However, it is also desirable, for cost reasons, to limit the nickel content to a maximum content of 1% or less. For similar reasons, molybdenum may be added in an amount of 0.40% or less.

Likewise, optionally, an addition of copper with a content not exceeding 5% is one means of hardening the steel by precipitation of copper metal. However, above this content, copper is responsible for the appearance of surface defects in hot-rolled sheet.

Titanium, niobium and vanadium are also elements that may optionally be used to achieve hardening by precipitation of carbonitrides. However, when the Nb or V or Ti content is greater than 0.50%, excessive carbonitride precipitation may cause a reduction in toughness, which has to be avoided.

The method of implementing the manufacturing process according to the invention is as follows. A steel having the composition mentioned above is smelted. After the smelting, the steel may be cast in ingot form, or cast continuously in slab form with a thickness of around 200 mm. The steel may also be cast in thin slab form, with a thickness of a few tens of millimeters. Of course, although the present invention illustrates the application of the invention to flat products, it may be applied in the same way to the manufacture of long products made of Fe—C—Mn steel.

These cast semifinished products are firstly heated to a temperature between 1100 and 1300° C. This has the purpose of making every point reach the temperature ranges favorable for the large deformations that the steel will undergo during rolling. However, the reheat temperature must not be above 1300° C. for fear of being too close to the solidus temperature, which could be reached in any manganese and/or carbon segregated zones, and of causing the local onset of a liquid state that would be deleterious to hot forming. Of course, in the case of the direct casting of thin slabs, the hot-rolling step for these semifinished products, may be carried out directly after casting, without passing via the intermediate reheat step.

The semifinished product is hot-rolled, for example down to a hot-rolled strip thickness of 2 to 3 millimeters in thickness. The low aluminum content of the steel according to the invention prevents excessive precipitation of AlN, which would impair hot deformability during rolling. To avoid any cracking problem through lack of ductility, the end-of-rolling temperature must be 890° C. or higher.

Moreover, it is known that industrial lines include rapid cooling devices, for example those operating by water spray, located between the final hot-rolling step and the coiling. These devices increase the rate of natural cooling of the products so that the length of the industrial lines is not excessively long.

Figure 2:
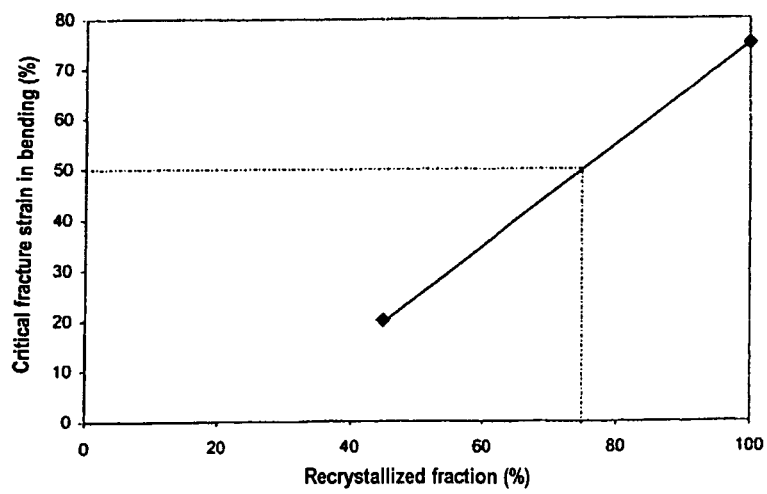
FIG. 2 shows the influence of the recrystallized fraction on the critical strain at fracture in bending.

In combination with a given end-of-rolling temperature, the inventors have shown, as indicated in FIG. 1, that a minimum delay must be respected between the end of rolling and the start of rapid cooling, so as to achieve satisfactory recrystallization of the rolled product after coiling. During this delay, the product undergoes natural cooling. Thus, a minimum delay of 12 s at 890° C., or 4 s at 905° C., makes it possible to achieve complete recrystallization. More generally, parameters (temperature and minimum delay) lying within the region defined by ABCDEFA in FIG. 1 result in complete recrystallization under satisfactory productivity conditions. Recrystallization corresponding to a minimum fraction of 75% is obtained when these conditions (temperature and minimum delay) lie within the region defined by ABCD'E'F'A. FIG. 2 shows the influence of the recrystallized fraction on the critical strain for the appearance of cracks in bending. A high bendability, and more generally a high deformability, requires high critical strain values, of greater than 50%. FIG. 2 shows that this is obtained when the recrystallized fraction after rolling is greater than 75%.

Figure 3:
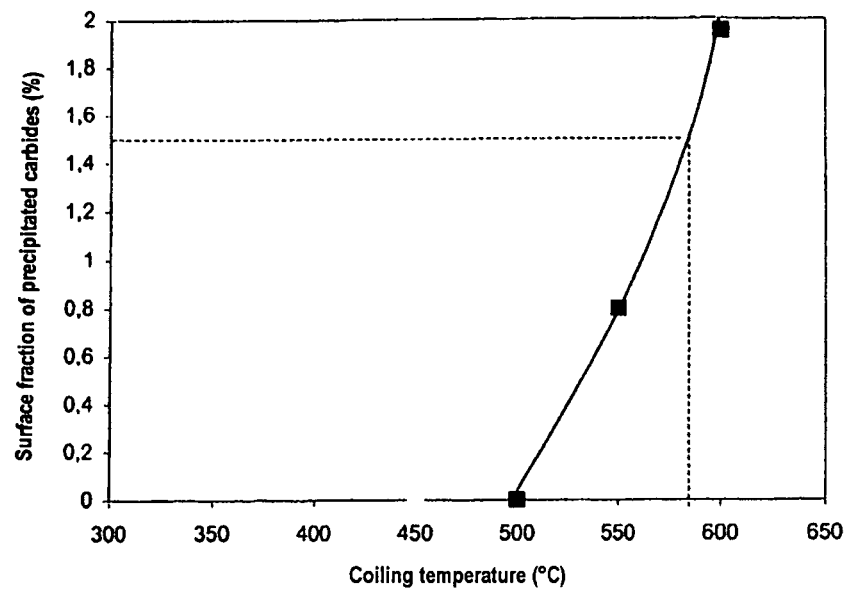
FIG. 3 shows the influence of the coiling temperature on the surface fraction of precipitated carbides.
Figure 4:
FIG. 4 is a micrograph illustrating an example of intergranular carbide precipitation.
Figure 5:
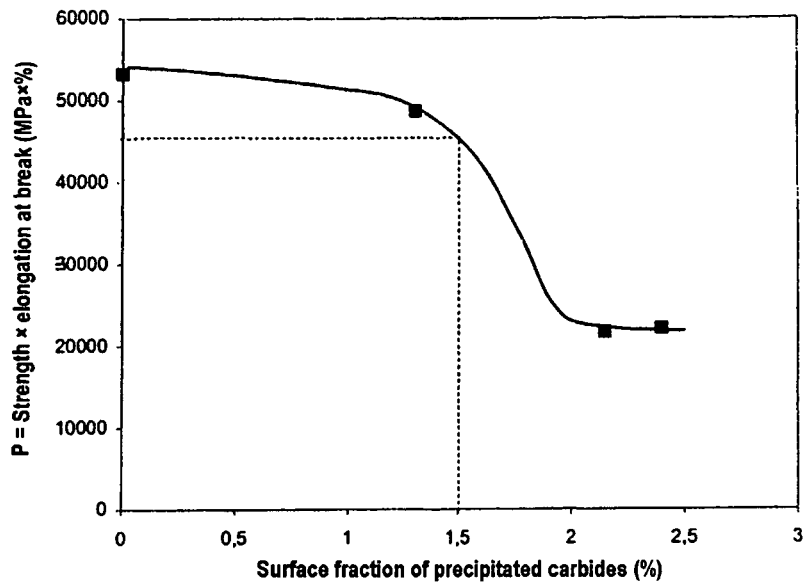
FIG. 5 illustrates the influence of the surface fraction of precipitated carbides, of constant grain size, on the product P (strength×elongation at fracture)

After rolling, the strip has to be coiled at a temperature such that no significant precipitation of carbides (essentially cementite $(Fe,Mn)_3C$)) occurs, something which, as will be seen later, would result in a reduction in certain mechanical properties. FIG. 3 illustrates the influence of the coiling temperature on the surface fraction of precipitated carbides. Carbide precipitation essentially takes place at the austenitic grain boundaries, as the micrograph of FIG. 4 shows. FIG. 5 shows the influence of this precipitation on the product P (the tensile strength multiplied by the elongation at fracture) after hot rolling, for constant grain size. High values of this parameter therefore express a combination of high strength and high ductility. To obtain a value of P of greater than 45000 MPa×%, it is necessary for the surface fraction of precipitated carbides to be less than 1.5%. Since this deleterious aspect of carbide precipitation applies both to hot-rolled sheet and to cold-rolled and annealed sheet, it is necessary to comply with this these maximum permissible level of precipitation in both these situations.

From the results shown in FIG. 3, it may be seen that this condition is satisfied on hot-rolled product when the coiling temperature is below 580° C.

Figure 6:
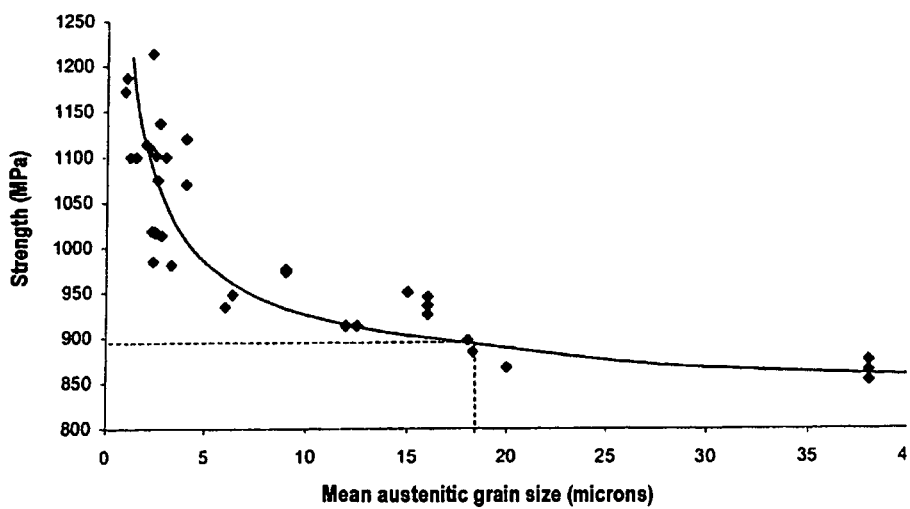
FIG. 6 shows the influence of the mean austenitic grain size on the strength of Fe—C—Mn steel sheet, in particular hot-rolled sheet.

Moreover, FIG. 6 illustrates the influence of the mean austenitic grain size on strength. In the case of hot-rolled products, this figure thus shows that the grain size must not exceed 18 microns for fear of the strength being less than 900 MPa.

The inventors have also demonstrated that even higher mechanical properties are obtained under the following conditions on hot-rolled product: the simultaneous combination of a grain size of less than 10 microns, a recrystallized fraction of 100% and a surface fraction of precipitated carbides of 0% results in a value of the product P ($R_m$×elongation at fracture) of greater than 60000.

The hot-rolled strip obtained by the process described may be used as such, or may undergo subsequent cold rolling followed by annealing. This additional step makes it possible to achieve a finer grain size than that obtained on hot-rolled strip, and therefore higher strength properties are obtained. Of course, it has to be carried out if it is desired to obtain products of smaller thickness, typically ranging from 0.2 mm to 4 mm.

A hot-rolled product obtained by the process described above is cold-rolled after a possible prior pickling operation has been performed in the usual manner.

After this rolling step, the grains are highly work-hardened and it is necessary to carry out a recrystallization annealing operation. This treatment has the effect of restoring the ductility and simultaneously reducing the strength. The annealing heat treatment must therefore be adjusted so as to obtain the (strength/elongation at fracture) combination desired for the application. Preferably, this annealing is carried out continuously.

This annealing is performed at a temperature of 600 to 900° C. for a time of 10 to 500 seconds, and the cooling rate at the end of the soak must be sufficiently rapid, greater than 0.5° C./s, to prevent the precipitation of carbides. Starting with an initial mean grain size of 18 microns or less on hot-rolled product, the above parameters make it possible to achieve a mean grain size ranging from 0.5 to 15 microns on cold-rolled sheet.

According to one particular method of implementation, the thickness may be reduced by cold rolling, not by means of a single rolling step but by two or more steps, each of the rolling steps being followed by an annealing operation. The grain size prior to the last rolling-and-annealing step must not exceed 18 microns, for fear of reducing the strength and the deformability of the end-product.

For the same reasons as those mentioned in the case of hot-rolled sheet, cold-rolled sheet must have a sufficient recrystallized fraction, of greater than 75%, in order to obtain satisfactory deformability during cold forming.

As in the case of hot-rolled sheet, the surface fraction of precipitated carbides must be less than 1.5% so that the product P ($R_m$×elongation at fracture) is greater than 45000 MPa×%.

Figure 7:
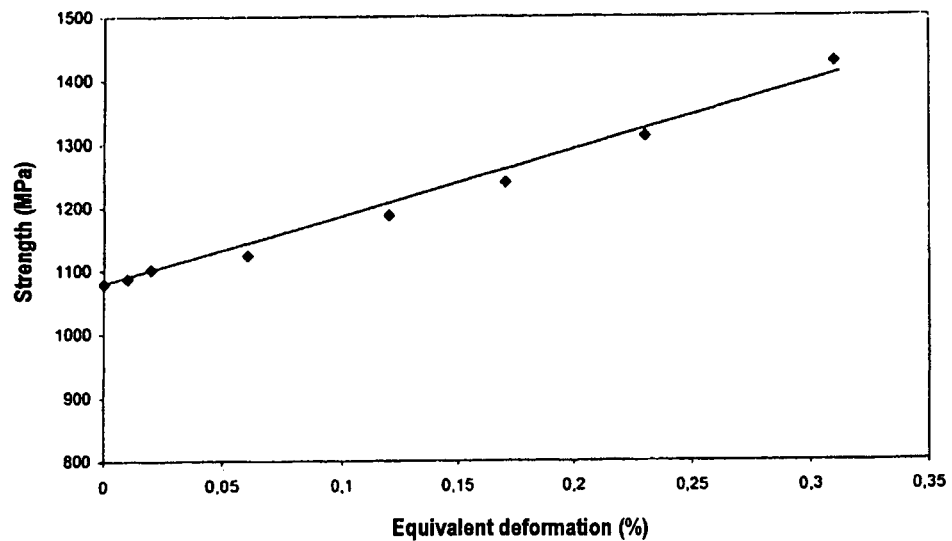
FIG. 7 illustrates the influence of the equivalent deformation ratio on the strength of a cold-rolled Fe—C—Mn steel sheet.

Steel sheets obtained, after hot or cold rolling, by the process according to the invention are characterized by an excellent ductility. Owing to the large reserve of plasticity, even higher strength values may be sought, at the expense of a slight lowering in ductility. Starting from a hot-rolled sheet, after coiling, or a cold-rolled and annealed sheet according to the process described above, an additional cold deformation operation is applied to it after the final annealing, for example by skin-pass rolling, reverse-bending tension leveling, simple drawing or any other suitable process. FIG. 7 shows the influence of the equivalent deformation ratio on the strength: the influence of the deformation ratio is relatively linear over a wide range—on average, 1% deformation increases the strength by 10 MPa. However, when the additional deformation exceeds 30%, the initial ductility of the product is excessively reduced, and this threshold must not be exceeded.

Figure 8:
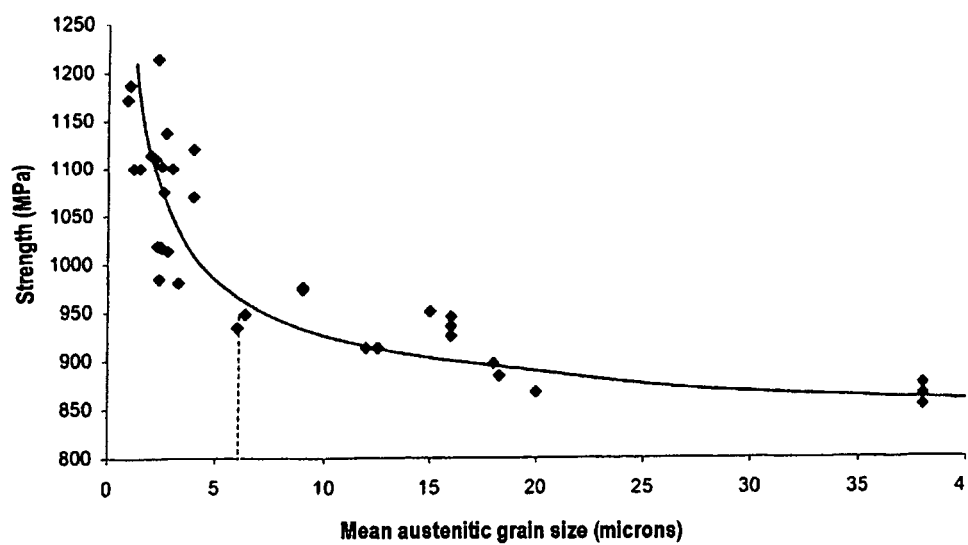
FIG. 8 shows the influence of the mean austenitic grain size on the strength of sheet, in particular cold-rolled sheet.

As FIG. 8 shows, a mean grain size on cold-rolled sheet of less than 6 microns makes it possible to achieve a strength of greater than 950 MPa.

By way of example, the following results will show advantageous characteristics provided by the invention, in particular as regards deformability with or without the presence of a defect, in static or dynamic stressing mode.

EXAMPLE 1

A steel of the following composition (contents expressed in percentages by weight): C: 0.6%; Mn: 22%; Si: 0.2% was smelted. A semifinished product was heated at 11850C and hot-rolled at a temperature of 9650C so as to achieve a thickness of 3.6 mm. A hold time of 3.5 s was observed before cooling. The coiling was carried out at a temperature below 450° C. The manufacturing conditions, identified by "I" in Table 1 below correspond to the invention. The mean grain size thus obtained was 9.5 microns, the structure was 100% recrystallized and the fraction of carbides was 0%. The static mechanical properties obtained on this hot-rolled sheet were particularly high, namely strength: 1012 MPa; elongation at fracture: 65.4%; product P: 66184.

Starting with this same composition, a thermomechanical scheme not corresponding to the conditions of the invention was performed, which resulted in a surface fraction of precipitated carbides of greater than 1.5% (condition identified as "R3").

The steel according to the invention was also compared with a hot-rolled reference steel identified as "R4", the strength level of which was very similar. This was a TRIP (Transformation Induced Plasticity) steel with a complex (ferrite, bainite, austenite, martensite) structure. This steel had the following composition (contents in % by weight): C: 0.20; Mn: 1.7; Si: 1.6; S: 0.003; P: 0.080; Al: 0.050; and Cu, Cr, Ni, Mo and N: 0.001.

Dynamic fracture tests were carried out on Charpy V specimens of small thickness (t=3 mm) at temperatures of +20° C. and −60° C. The results of these tests are given in Table 1.

TABLE 1

Results of Charpy V tests on hot-rolled sheet

|  | Identifier | Charpy fracture energy at +20° C. (Joules) | Charpy fracture energy at −60° C. (Joules) |
|---|---|---|---|
| Invention | I | 44 | 36 |
| Reference | R3 | 33 | 29 |
|  | R4 | 25 | 9 |

The steel according to the invention has substantially better toughness properties than the reference steels. This superiority is manifested at room temperature, and also under severe stressing conditions at very low temperature. It therefore completely solves the problem of how to obtain very good toughness under dynamic conditions.

EXAMPLE 2

Steels with the compositions indicated in Table 2 below were smelted (compositions expressed in percentages by weight). Apart from steels I1 and I2, the composition of reference steels is given for comparison, these being dual-phase steel (R1) and TRIP (Transformation Induced Plasticity) steel (R2), the strength level of which (1000 MPa) lies within a similar range.

Semifinished products of steels I1 and I2 were reheated at 1200° C., hot-rolled at a temperature of 920° C., in order to bring them to a thickness of 3 mm, and then, after a hold time of 10 seconds before cooling, coiled at a temperature of 450° C. The mean grain size obtained under these conditions was 10 microns. The structure was completely recrystallized, with no precipitated carbides.

TABLE 2

Composition of the steels

| Steel | C | Mn | Si | S | P | Al | Cu | Cr | Ni | Mo | N |
|---|---|---|---|---|---|---|---|---|---|---|---|
| I1 | 0.61 | 21.5 | 0.49 | 0.001 | 0.016 | 0.003 | 0.02 | 0.053 | 0.044 | 0.009 | 0.01 |
| I2 | 0.68 | 22.8 | 0.17 | 0.001 | 0.004 | 0.005 | 0.005 | 0.005 | 0.005 | 0.01 | 0.003 |
| R1 | 0.19 | 1.9 | 0.33 | 0.003 | 0.03 | 0.025 | 0.019 | 0.02 |  | 0.09 |  |
| R2 | 0.20 | 1.7 | 1.6 | 0.003 | 0.080 | 0.050 | 0.001 | 0.001 | 0.001 | 0.001 | 0.001 |

Steel I1 was then cold-rolled, then annealed under conditions resulting in various austenitic grain sizes ranging from 3 to 100 microns. Table 3 gives the annealing and recrystallization conditions (conditions a) to d)) and Table 4 gives the mechanical properties in tension, namely strength, elongation at fracture and the product P (strength×elongation at fracture) obtained under these conditions.

Under manufacturing condition b), the grain size prior to cold rolling and annealing at 800° C. was 100 microns.

It should be mentioned that a cold-rolling reduction ratio of 66% combined with annealing at 650° C. for 1 second results only in a partial recrystallization of 45%. The grain size of the recrystallized fraction was highly scattered, ranging from 1 to 10 microns.

Steel I2 was also cold-rolled with a reduction ratio of 55%, annealed at 700° C. for 120 seconds and cooled in air, at a rate of greater than 0.5° C./s (condition e), Table 3). A 1.5 micron mean grain size and a 1% surface fraction of precipitated carbides were thus obtained. Starting from condition e), a subsequent heat treatment with a soak at 850° C. for 60 seconds followed by water cooling (condition f), Table 3), allows this fraction of precipitated carbides to be reduced without excessive grain coarsening.

TABLE 3

Cold-rolling and annealing conditions

| Steel | | Mean grain size: Microstructure | Cold-rolling reduction ratio (%) | Annealing temperature (° C.) | Annealing time(s) |
|---|---|---|---|---|---|
| I1 | a)* | 3 microns | 60 | 700 | 120 |
| | b) | 15 microns | 16 | 800 | 240 |
| | c) | 100 microns | 50 | 1200 | 180 |
| | d) | Recrystallization: 45% | 66 | 650 | 1 |
| I2 | e)* | 1.5 microns with carbides | 55 | 700 | 120 s + slow cooling |
| | f)* | 4 microns | 55 + 5 | 700 + 850 | 120 s + slow cooling + 60 s + water cooling |

*According to the invention.

TABLE 4

Tensile mechanical properties obtained

| Steel | Condition | Mean grain size: Microstructure | Strength (MPa) | Elongation at fracture (%) | P = $R_m$ × A (MPa × %) |
|---|---|---|---|---|---|
| I1 | a)* | 3 microns | 1130 | 55 | 62150 |
| | b) | 15 microns | 950 | 30 | 28500 |
| | c) | 100 microns | 850 | 40 | 34000 |
| | d) | Recrystallization: 45% | 1200 | 25 | 30000 |
| I2 | e)* | 1.5 microns with 1% carbides | 1100 | 50 | 55000 |
| | f)* | 4 microns | 1070 | 50 | 53500 |

*According to the invention.

The steel manufacturing conditions a) correspond to those of the invention and result in high values of strength and of parameter P. Under condition b), the 100 micron grain size before cold rolling exceeds the 18 micron grain size mentioned above, and the final grain size (15 microns) is greater than the 6 micron grain size also mentioned above. Under condition c), the 100 micron grain size in cold-rolled sheet is also excessive. Consequently, conditions b) and c) result in unsatisfactory values of the parameter P and the strength.

Condition d) corresponds to a situation in which the recrystallization is insufficient (crystallized fraction: 45%, i.e. less than the 75% value mentioned above), which results in a low value of the parameter P.

In the case of steel I2, the manufacturing conditions e) are associated with a fine grain size of 1.5 microns and an amount of precipitated carbides of less than 1.5%. In the same way as in the case for steel f), the fine grain size results in high values of strength and the parameter P.

Figure 9:
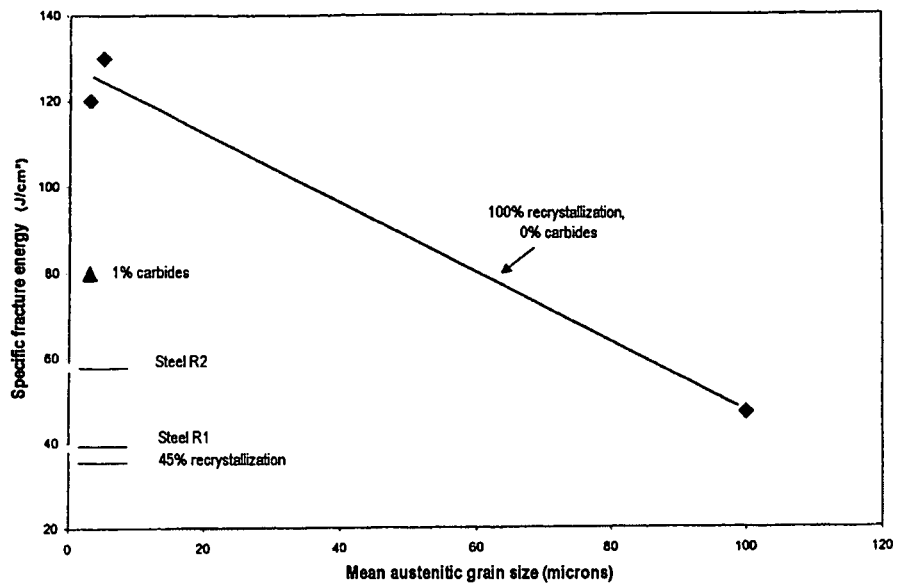
FIG. 9 illustrates the influence of the mean austenitic grain size on the specific fracture energy of cold-rolled sheet.

Furthermore, fracture strength tests were carried out on CT (Compact Tension) type specimens having dimensions of 36×55 mm² and comprising an initial notch of 8 mm in depth. The tests were carried out at room temperature and comprised a recording of the load and the displacement. The fracture energy of the various steels, determined by the area under the curve of the force-displacement plot, was divided by the area of the fracture surface so as to determine a specific fracture energy. FIG. 9 indicates that recrystallized steels of small grain size, containing no precipitated carbides, have the best fracture toughness characteristics. For a similar grain size, a 1% content of precipitated carbides reduces the toughness by about one third. A very low fracture toughness is also observed when the mean grain size is increased up to 100 microns, or when there is greatly insufficient recrystallization.

FIG. 9 also demonstrates the fact that sheets manufactured according to the invention offer better toughness characteristics than reference steels R1 and R2, since, for equivalent strength, the fracture toughness is two to three times greater than that of these steels.

Figure 10:
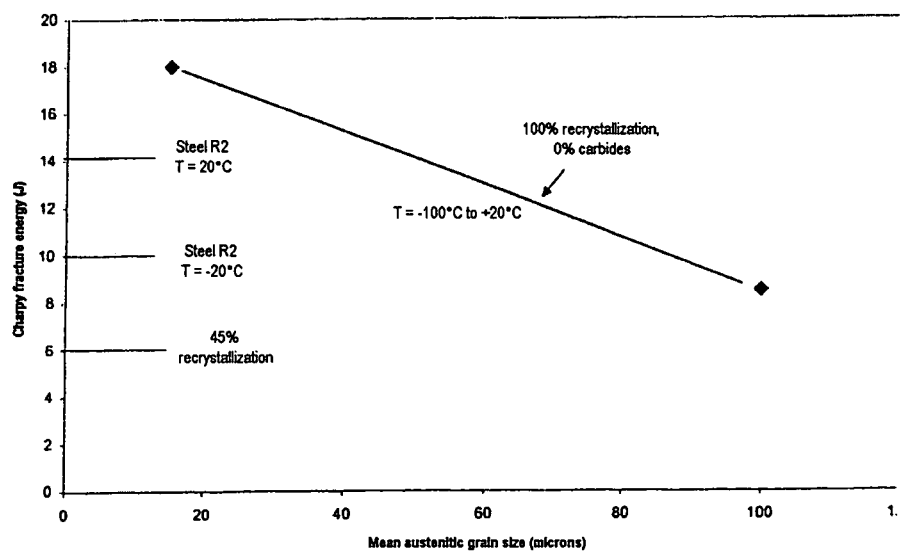
FIG. 10 shows the influence of the mean austenitic grain size on the Charpy fracture energy of cold-rolled sheet.

Moreover, dynamic fracture tests were carried out on a Charpy V specimen of reduced thickness (t=1 to 1.3 mm) over a range from 20° C. to −100° C. No reduction in fracture energy was observed at low temperatures. The various cold-rolling and annealing conditions for steel I1, the variation in fracture energy with grain size is indicated in FIG. 10. In a similar way to that which was noted in static fracture, too large a grain size or insufficient recrystallization reduces the fracture energy. For comparison, the fracture energy values at 20° C. and at −20° C. for the above steel R2 have also been plotted: it should be noted that the fine-grained steels of the invention make it possible to achieve higher toughness values under dynamic conditions than those of this reference steel. In addition, as mentioned above, the steels according to the invention are practically insensitive to temperature variations, unlike the reference steels which exhibit a ductile/brittle transition temperature. Thus, even in the event of very substantial impacts (very low service temperature, high deformation rate) the use of steels of the invention avoids the risk of sudden fracture.

Figure 11:
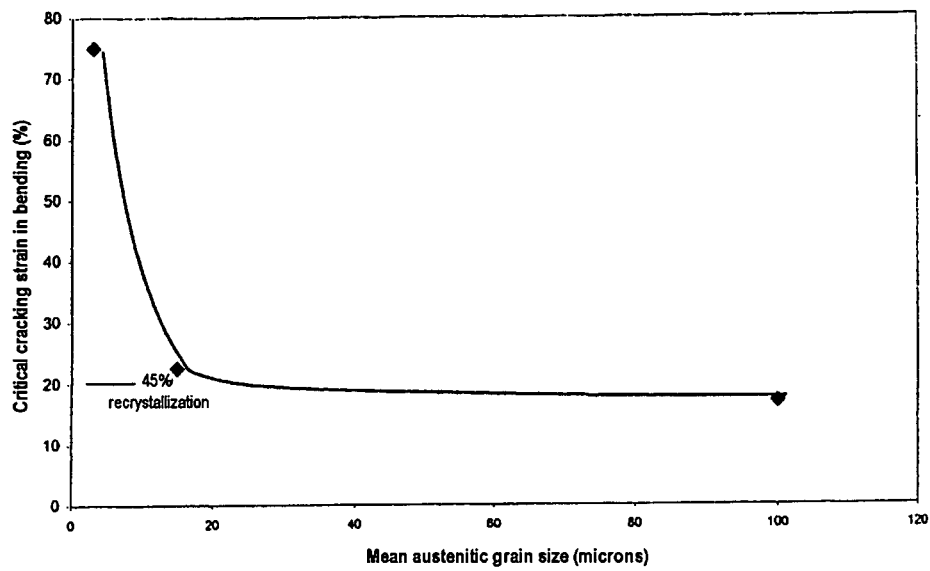
FIG. 11 illustrates the influence of the mean austenitic grain size on the critical cracking strain in bending.

Apart from the notched fracture strength capability, the steels of the invention exhibit great deformability for the manufacture of relatively complex parts. FIG. 11 indicates the bending capability of steel I1 under the various manufacturing conditions presented in Table 3, that is to say for a mean grain size varying from 3 to 100 microns. As was seen previously, apart from the advantage of achieving a strength of greater than 950 MPa, a mean grain size of less than 6 microns also makes it possible to obtain excellent deformability in bending. Here again, insufficient recrystallization leads to inferior results.

Figure 12:
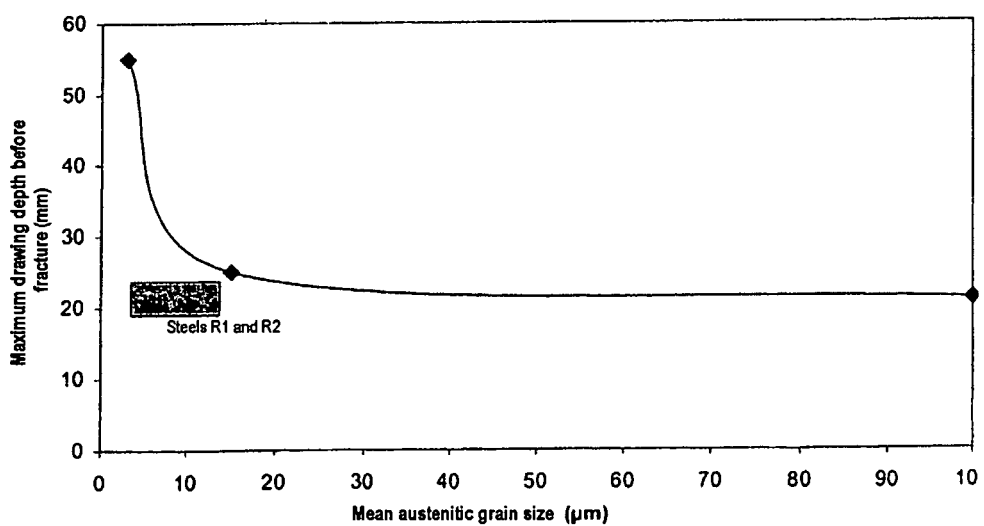
FIG. 12 shows the maximum drawing depth before fracture as a function of the mean austenitic grain size.

FIG. 12 also illustrates the benefit of cold-rolled and annealed steels according to the invention under complex deformation conditions such as those encountered in drawing tests using a cruciform tool that stresses the material in expansion and in necking. The tests were carried out on a blank having dimensions of 300×300 mm², with a tool of 60 mm in height. FIG. 12, which illustrates the maximum drawing depth before fracture, indicates that the steels according to the invention, of small grain size, have greatly superior properties to the reference steels R1 and R2.

Thus, for the same strength, the steels according to the invention are very much more deformable than conventional dual-phase or TRIP steels, and greater toughness. For the same deformation, their strength level is much higher. When they are used in the automotive industry, they contribute very effectively to reducing the weight of vehicles, while increasing safety in the event of an impact. The hot-rolled or cold-rolled steel sheets according to the invention are therefore advantageously used to manufacture reinforcing parts that require very high mechanical properties under static or dynamic loading conditions.

The invention claimed is:

1. A process for manufacturing a hot-rolled sheet made of iron/carbon/manganese steel, in which:
   providing a semifinished product cast from a steel whose chemical composition comprises, the contents being expressed by weight:
   $0.5\% \leq C \leq 0.7\%$
   $17\% \leq Mn \leq 24\%$
   $Si \leq 3\%$
   $Al \leq 0.050\%$
   $S \leq 0.030\%$
   $P \leq 0.080\%$
   $N \leq 0.1\%$,
   and, optionally, one or more elements such that:
   $Cr \leq 1\%$
   $Mo \leq 0.40\%$
   $Ni \leq 1\%$
   $Cu \leq 5\%$
   $Ti \leq 0.50\%$
   $Nb \leq 0.50\%$
   $V \leq 0.50\%$,
   the composition further comprising iron and inevitable impurities resulting from the smelting;
   heating the semifinished product to a temperature between 1100 and 1300° C.;
   hot rolling the semifinished product so an end-of-rolling temperature is 890° C. or higher and precipitation of AlN is prevented;
   observing a time delay between said end of rolling and a subsequent rapid cooling operation, in such a way that the point defined by said time delay and said end-of-rolling temperature lies within an area defined by the ABCD'E'F'A plot of FIG. 1;
   coiling said sheet at a temperature below 580° C. to obtain a coiled hot-rolled sheet;
   cold deforming said coiled hot-rolled sheet with an equivalent deformation ratio of 30% or less, without further annealing.

2. The process as claimed in claim 1, wherein said semifinished product is cast in the form of thin strip, by being cast between steel rolls.

3. The process as claimed in claim 1, wherein said coiled hot-rolled sheet is subjected to a cold deformation operation with an equivalent deformation ratio of between 1 and 30%.

4. The process as claimed in claim 1, wherein a delay is observed between said end of rolling and a subsequent rapid cooling operation, in such a way that the point defined by said delay and said end-of-rolling temperature lies within an area defined by the ABCDEFA plot of FIG. 1.

5. A process for manufacturing a cold-rolled austenitic iron/carbon/manganese steel sheet, comprising:
   providing a semifinished product cast from a steel whose chemical composition comprises, the contents being expressed by weight:
   $0.5\% \leq C \leq 0.7\%$
   $17\% \leq Mn \leq 24\%$
   $Si \leq 3\%$
   $Al \leq 0.050\%$
   $S \leq 0.030\%$
   $P \leq 0.080\%$
   $N \leq 0.1\%$,
   the composition further comprising iron and inevitable impurities resulting from the smelting;
   heating the semifinished product to a temperature between 1100 and 1300° C.;
   hot rolling the semifinished product so an end-of-rolling temperature is 890° C. or higher and precipitation of AlN is prevented;
   observing a time delay between said end of rolling and a subsequent rapid cooling operation, in such a way that the point defined by said time delay and said end-of-rolling temperature lies within an area defined by the ABCD'E'F'A plot of FIG. 1;
   coiling said sheet at a temperature below 580° C. to obtain a coiled hot-rolled sheet, the coiled hot-rolled sheet having an austenitic grain size of less than 18 microns; and
   subjecting the coiled hot-rolled sheet to at least one cold-rolling followed by an annealing operation, each cold-rolling comprising:
   cold-rolling said sheet and
   carrying out an annealing operation at a temperature of between 600 and 900° C. for a time of between 10 and 500 seconds, followed by a cooling operation, the cooling rate being greater than 0.5° C/s.

6. The process for manufacturing a cold-rolled sheet as claimed in claim 5, wherein, after the final annealing, a cold-deformation operation is carried out with an equivalent deformation ratio of 30% or less.

7. The process for manufacturing a cold-rolled sheet as claimed in claim 5 wherein the composition includes one or more of the following elements such that:
   $Cr \leq 1\%$
   $Mo \leq 0.40\%$
   $Ni \leq 1\%$
   $Cu \leq 5\%$
   $Ti \leq 0.50\%$
   $Nb \leq 0.50\%$
   $V \leq 0.50\%$.

8. A process for manufacturing a steel sheet, comprising:
   smelting a semi-finished product from a steel;
   casting the semifinished product;
   heating the semifinished product to a temperature of between 1100 and 1300° C.;
   rolling the semifinished product such that a hot-rolled sheet is obtained, and that an end-of-rolling temperature at an end of the rolling is 890° C. or higher;
   causing a delay between the end of the rolling and a start of a cooling such that a point defined by the delay and the end-of-rolling temperature lies within an area defined by the ABCD'E'F'A plot of FIG. 1; and
   coiling the hot-rolled sheet at a temperature below 580° C., such that a coiled hot-rolled sheet is obtained, such that the coiled hot rolled sheet has a recrystallized fraction of greater than 75%, a tensile strength of greater than 900 MPa and a mean grain size of less than 18 microns; and
   subjecting the coiled hot-rolled sheet to a cold deformation operation with an equivalent ratio of 30% or less, wherein the steel from which the semifinished product is smelted comprises, in weight %, 0.5%≤C≤0.7%, 17%≤Mn<24%, Si≤3%, Al≤0.050%, S≤0.030%, P≤0.080% and N≤0.1%, and further comprises iron and inevitable impurities resulting from the smelting.

9. The process as claimed in claim 8, wherein the casting comprises casting a semifinished product between steel rolls into a thin strip.

10. The process as claimed in claim 8, wherein the delay is caused such that the point defined by said delay and said end-of-rolling temperature lies within an area defined by the ABCDEFA plot of FIG. 1, and that the hot-rolled sheet after the coiling and before the start of the cooling has the recrystallized fraction of 100%.

11. A process for manufacturing a cold-rolled steel sheet, comprising:
   subjecting a steel sheet obtained by the process as claimed in claim 8 to at least one operation,
   wherein each of the at least one operation comprises: cold-rolling the sheet; annealing the sheet at a temperature of between 600 and 900° C. for a period of between 10 and 500 seconds; and cooling the sheet after the annealing, at a cooling rate greater than 0.5° C/s such that a surface fraction of precipitated carbides is 0%,
   the steel sheet before a first of the at least one operation has a mean grain size of less than 18 microns and a recrystallized fraction of greater than 75%, and
   the steel sheet after being subjected to the at least one operation has a mean grain size in a range from 0.5 to 15 microns.

12. The process as claimed in claim 11, further comprising:
   performing a cold deformation operation after the at least one operation, such that an equivalent deformation ratio is of 30% or less.

* * * * *